United States Patent [19]

Cotton et al.

[11] Patent Number: 4,714,576
[45] Date of Patent: Dec. 22, 1987

[54] METHOD OF MANUFACTURING A POLYPHENYLENE SULFIDE POTTED POLE AND COIL ASSEMBLY

[75] Inventors: Dale L. Cotton, LaGrange; Frank J. Nachman, Downers Grove, both of Ill.

[73] Assignee: General Motors Corporation, Detroit, Mich.

[21] Appl. No.: 869,586

[22] Filed: Jun. 2, 1986

Related U.S. Application Data

[63] Continuation-in-part of Ser. No. 808,671, Dec. 16, 1985, abandoned, which is a continuation of Ser. No. 550,749, Nov. 10, 1983, abandoned.

[51] Int. Cl.[4] .................... B29C 67/22; B29C 39/10
[52] U.S. Cl. .................... 264/46.5; 264/46.6; 264/46.7; 264/54; 264/262; 264/265; 264/267; 264/272.19; 264/272.2
[58] Field of Search .................... 264/46.4, 46.5, 46.6, 264/46.7, 262, 265, 267, 271.1, 272.19, 272.2, 54, 261; 521/189

[56] References Cited

U.S. PATENT DOCUMENTS

| | | | |
|---|---|---|---|
| 2,061,388 | 11/1936 | Schou | 91/70 |
| 3,182,383 | 5/1965 | Rosenberg et al. | 29/155.57 |
| 3,333,131 | 6/1967 | Bush et al. | 310/194 |
| 3,359,631 | 12/1967 | Larsen et al. | 29/606 |
| 3,867,189 | 2/1975 | Edmonds, Jr. | 521/189 |
| 3,904,724 | 9/1975 | Kipple et al. | 264/272.19 |
| 3,925,270 | 12/1975 | Hunter | 521/189 |
| 3,998,767 | 12/1976 | Walton | 521/189 |
| 4,145,474 | 3/1979 | Kertscher et al. | 428/379 |
| 4,163,037 | 7/1979 | Niznik | 264/54 |
| 4,183,822 | 1/1980 | Collington et al. | 521/189 |
| 4,186,162 | 1/1980 | Daley | 264/46.5 |
| 4,244,156 | 1/1981 | Watts | 264/46.5 |
| 4,293,784 | 10/1981 | Zdaniewski et al. | 310/45 |
| 4,370,292 | 1/1983 | Yanase et al. | 264/272.19 |

OTHER PUBLICATIONS

Plastics Materials and Processes; Seymour S. Schwartz (Plastics Consultant) and Sidney H. Goodman (Manager, Materials Products Department) Hughes Aircraft Co.; Van Nostrand Reinhold Company (copyright 1982) pp. 281–283.

Primary Examiner—Philip Anderson
Attorney, Agent, or Firm—Lawrence B. Plant

[57] ABSTRACT

A method of making a pole and coil assembly for a dynamo-electric machine (e.g., interpole for locomotive traction motors) comprising providing the coil wires with a polyphenylene sulfide coating, filling the pole-coil interspace with solid, foamable polyphenylene sulfide ground insulation and heating the assembly such as to foam the ground insulation in place and cause it to constrictively engage and bond to the pole as well as fuse to the PPS coating on the coil. The pole surface may be roughened and/or coated with PPS for improved pole retention and/or may be nickel plated for improved corrosion resistance.

17 Claims, 10 Drawing Figures

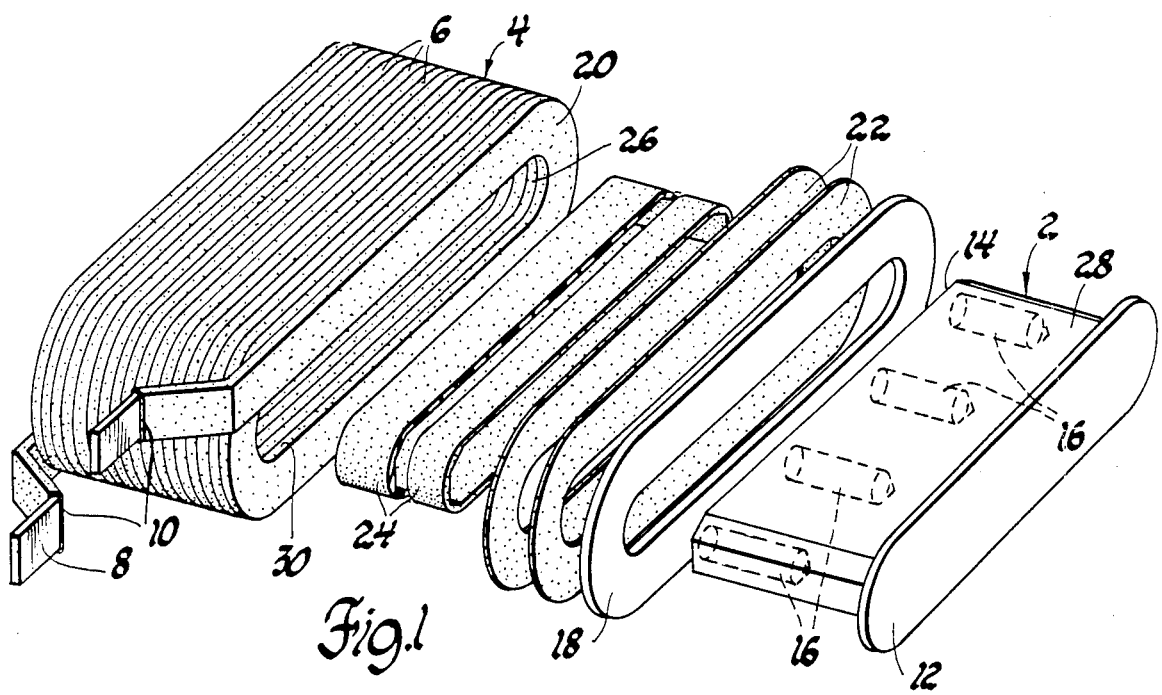
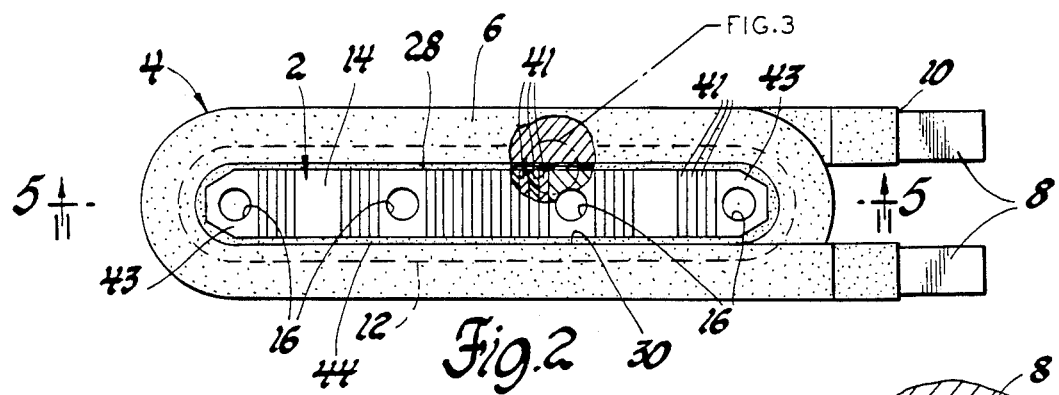
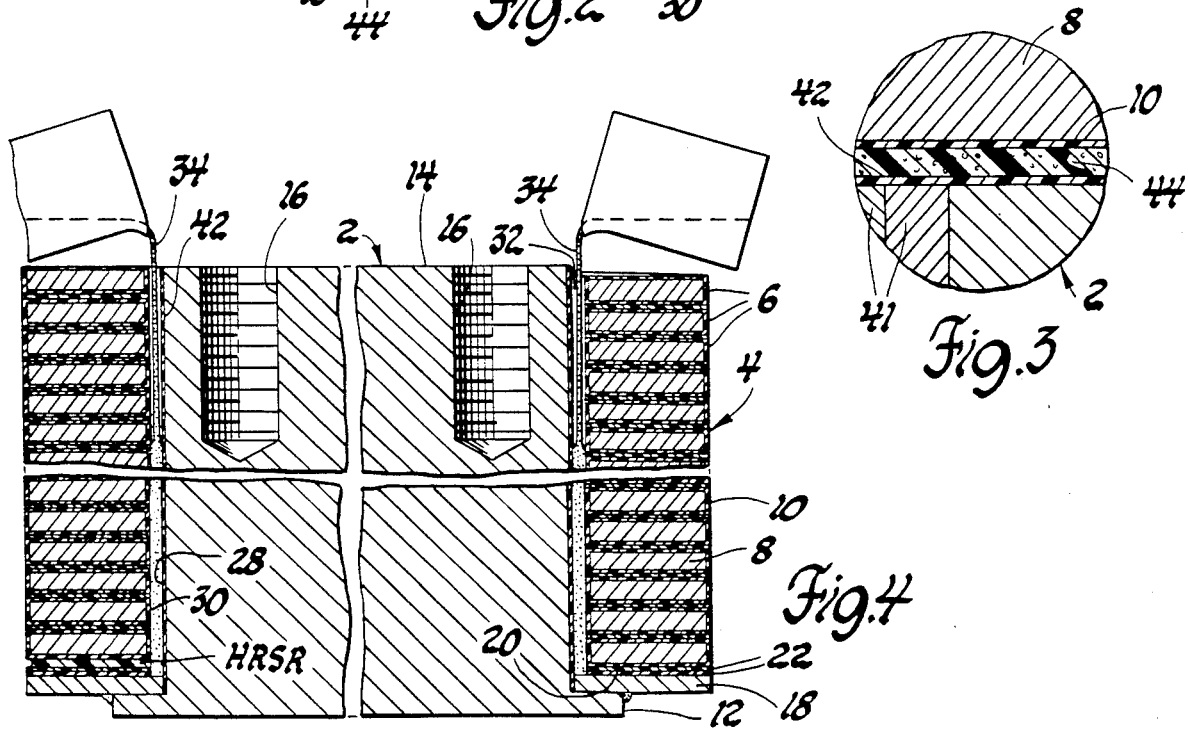
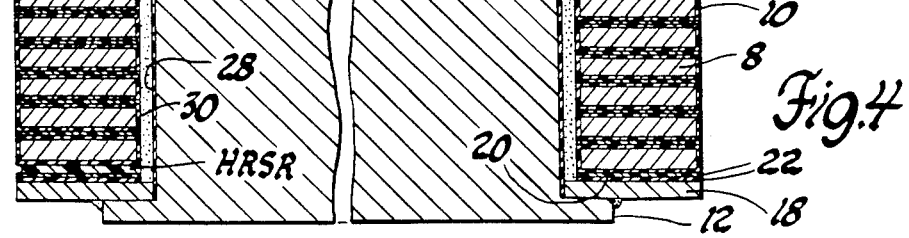

METHOD OF MANUFACTURING A POLYPHENYLENE SULFIDE POTTED POLE AND COIL ASSEMBLY

This application is a continuation-in-part of application Ser. No. 808,671 filed Dec. 16, 1985, now abandoned which, in turn, was a continuation application of Ser. No. 550,749 filed Nov. 10, 1983 now abandoned.

This invention relates to a method of making pole and coil assemblies for dynamo-electric machines (e.g., motors and generators). The invention is useful with interpole, main field, stator and armature assemblies and the like and is particularly applicable to such devices as locomotive traction motors which are subjected to severe mechanical shock and high temperature excursions in service.

BACKGROUND OF THE INVENTION

A pole and coil assembly includes a magnetizing coil composed of a plurality of turns of copper wire or strap. The several turns of the coil are electrically insulated one from the other as by a coating or wrapping on the wire or by means of insulating spacers placed between the several turns. In some instances combinations of two or more of the foregoing may be used for more effective turn-to-turn insulation. The magnetizing coil surrounds a magnetizable ferrous metal pole piece (e.g., steel) and is electrically insulated therefrom by a material or materials known as ground insulation in the annular space between the coil and the pole. Typical ground insulations used heretofore have included mica sheets, resin impregnated glass wrappings, silicone rubber, and a variety of thermoplastic and thermosetting resins (e.g., epoxy) injected into the pole-coil interspace.

The power output of a dynamo-electric machine can be increased by increasing the current flow through its field and/or armature (and correspondingly the interpoles) coils. Increasing the current flow, however, also increases the temperature of the coils. The power output rating of a machine is often limited only by the ability of the pole-and-coil's insulation system to withstand high temperature excursions resulting from transient and sustained high current loadings.

The current carrying capacity of the coils could be increased without increasing temperature by providing more copper therein, and accordingly less resistance. If the pole and coil's insulation system were to remain the same, increasing the copper content of the coils would require a costly increase in the physical size (i.e., volume/shape) of the machine's external housing and related parts. However, room for additional coil copper might be found within the confines of a standard-size machine housing if a more efficient insulation system could be devised. A more efficient insulation system would provide high temperature stability and good thermal conductivity yet consume less space than heretofore required without sacrificing dielectric protection. The converse is also true. In this regard, a more efficient insulation system could permit the coil to run hotter and thereby permit reduction in the amount of coil copper without reducing output ratings.

Ideally, the insulation system of a pole and coil assembly for use in severe service environments will perform several important functions simultaneously. In this regard, the insulation: will rapidly dissipate heat generated within the coil to the ambient and the pole; will aid in anchoring the coil substantially immovably with respect to the pole; and will not only provide adequate pole-to-coil ground insulation but also have sufficient thermal stability to withstand high temperature thermal excursions without breaking down.

It is an object of the present invention to provide a simple, effective and economical process for providing a highly efficient insulation system for a pole and coil assembly which system is characterized not only by good dielectric properties, good thermal conductivity and high temperature thermal stability but also serves to so unite the coil and pole together as to enhance the ruggedness thereof. This and other objects and advantages of the present invention will become more readily apparent from the detailed description thereof which follows.

THE INVENTION

The method of the present invention is based on the use of polyphenylene sulfide (hereafter PPS) as the primary constituent of the insulation system. PPS, which is known to have excellent thermal stability, mechanical strength, dielectric properties and thermal conductivity, is sold under the trade name, RYTON (Phillips Chemical Co.), and comes commercially in a variety of filled (i.e., mineral, glass) and unfilled forms. RYTON impregnated glass cloth and mats are also available. In accordance with the method of the present invention, the pole piece is positioned loosely within a coil of magnetizing wire having a thin substantially imperforate layer of PPS thereon. The PPS layer on the coil wire insulates the several turns one from the other, provides an inner surface of PPS which bonds to the ground insulation and offers little thermal resistance to the transfer of heat from the coil to the ambient. The pole is spaced from the coil by a narrow gap (e.g., 2.2 mm) which forms a pole-coil interspace for receiving PPS ground insulation. The pole-coil interspace is substantially completely filled with a solid, foamable PPS resin (e.g., molding grades RYTON R-4, R-10, Br-31, etc.). Such resins typically have a melting point greater than about 540° F. (282° C.) and a melt flow of less than about 60 g/min as determined by ASTM D1238 procedure @ 316° C. and 5 kg. By foamable PPS is meant PPS materials which contain a thermally activated blowing agent or agents which expand, volatize or decompose to produce gas bubbles throughout the PPS and thereby cause foaming and swelling of the PPS upon heating. For purposes of the present invention, it is preferred that the foamable PPS have a swelling coefficient of at least about 1.1 at temperatures in excess of its melting point. As used herein, the expression "swelling coefficient" is intended to mean the ratio of the volume of a material after foaming to the volume of the same material before foaming when the swelling is effected in an unconfined space. In practice, coils have been made with foamable PPS materials having swelling coefficients of up to about 1.3.

In one embodiment of the invention, the PPS-filled pole-coil interspace is sealed off and the entire assembly heated sufficiently to activate the blowing agent, foam and swell the PPS within the confines of the pole-coil interspace and cause the foam to bond to the outer surface of the pole piece and the PPS coated inner surface of the coil wire. Sealing off of the pole-coil interspace contains the foam as it swells and causes it not only to completely fill the interspace but also to constrictively engage the pole as the pressure in the space rises. At the same time, the turns of the PPS-coated coil bond to each other (or to any spacers as may be therebetween). For purposes of the present invention, the ground insulation is said to be bonded to the outer surface of the pole piece when it so sticks or adheres to the pole's surface that, upon axial displacement of the pole with respect to the coil, the pole carries with it a thin layer of PPS clinging to its surface thereby evidencing breakage of PPS-to-PPS foam bonds adjacent the pole surface rather than mere slipping of the pole from the foam along the pole-foam interface. A preferred solid foamable PPS useful with this embodiment of the invention is RYTON Br-31 which contains about 40% (by weight) short glass fibers distributed throughout and bonds particularly well to the pole's surface.

In accordance with a preferred embodiment of the invention, the interspace between the pole and coil is filled primarily with a PPS-glass mat comprising an entanglement of long, randomly oriented glass fibers impregnated with PPS. The glass mat contains about 40%, by weight glass and serves to substantially contain the PPS within the pole-coil interspace during heating in such a manner as to allow the PPS to swell significantly in directions normal to the mat (i.e., toward the pole and coil) but very little, if any, in the axial (i.e., parallel to the central axis of the pole) or lateral (i.e., perpendicular to the central axis of the pole) directions. This ability of the glass mat to substantially contain the PPS and focus swelling to substantially one direction reduces the need for sealing off the interspace during the heating/bonding/swelling step.

As wetting of the pole surface is thought to play a role in promoting bonding, the temperature required for bonding the PPS to the pole will vary somewhat depending on several variables including the particular PPS product used and the composition and condition of the pole surface. Moreover, relieving (e.g., notching, grooving) or roughening (e.g., knurling, abrading, shot blasting, etc.) the outer surface of the pole significantly increases the force required to axially separate the pole from the coil. In this regard, visual inspection of pole and coil assemblies so made indicates that relieving or roughening the pole surface provides keying or anchorage sites for the PPS in the pole surface. A particularly effective way to roughen the surface of a steel pole piece and achieve excellent bonding thereto is to steel shot blast the surface of the pole and then foam the PPS ground insulation thereagainst at temperatures above about 635° F. (335° C.). Another way to obtain highly effective pole-foam bonding and improved pole-coil dielectric protection is to precoat the surface of the pole with a thin coating of substantially imperforate PPS much like that covering the coil wires. A layer of nickel will preferably be plated onto the surface of the pole prior to deposition of a PPS coating in order to provide prolonged corrosion resistance.

A preferred way to make highly durable interpoles utilizes the aforesaid PPS-glass mat in combination with at least one (preferably three or four) layer of a PPS-bonding cloth wrapped about the pole. In this regard, the pole is wrapped with a PPS-bonding cloth comprising woven glass filaments having a skin of PPS on each major surface thereof. Such a PPS-bonding cloth wrap may be used with or without the aforesaid thin coating of PPS on the pole surface and bonds to both the pole and the PPS-glass mat during the heating step.

Following heating/foaming, the assembly is cooled to solidify the foamed PPS in its swollen, pole-constricting condition which results in a rugged assembly having optimal heat transfer interfacing between the coil, foam and pole piece. It is noted that during the heating step the PPS undergoes a certain amount of cross-linking and that its melting point raises somewhat depending on the heating time and temperature. High temperatures and prolonged heating times will actually more fully cure (i.e., thermoset) the PPS. Preferably, the heating will be such as to avoid a fully thermoset condition which results in the foam being weakened by embrittlement. Hence, the foam will preferably solidify during cooling to yield a tougher ground insulation.

In the absence of a PPS-glass mat, as much foamable PPS solids are packed into the pole-coil interspace as is conveniently possible. Complete filling (i.e., 100%) of the pole-coil interspace with solid PPS is neither essential nor practical since, during foaming, the PPS foam will seek out and fill any remaining space. Swelling on the order of about 10% by volume has been found to be all that is necessary to completely fill the pole-coil interspace and provide sufficient internal pressure to constrictively grip the pole. While greater swelling is possible, the reduced solids content of the foam resulting therefrom tends not only to reduce the mechanical and dielectric strength of the foam but also reduces its ability to effectively conduct heat out of the coil and into the pole. Preferred ground insulation foams made according to the process of the present invention will comprise about 90% by volume solids and have substantially uniform porosity. The foams will preferably include small glass fibers distributed throughout for strength, or most preferably will include a mat of long, randomly oriented, entangled glass fibers submerged therein.

The solid foamable PPS may comprise a molded sleeve sized and shaped to conform substantially to the dimensions of the pole-coil interspace. Such a molded PPS sleeve is fitted snugly between the pole and coil prior to heating. The solid foamable PPS may, however, be introduced into the pole-coil interspace in a number of other ways. For example, a plurality of discrete blocks or slabs of the foamable PPS may be individually inserted around the pole in the pole-coil interspace. In this regard, assemblies have been made by axially slicing the aforesaid sleeve into a number of elongated segments and inserting the individual segments one-by-one and side-by-side into the pole-coil interspace. Moreover, particulate foamable PPS may be poured or injected into the pole-coil interspace. If introduced as particles, it is desirable to vibrate the assembly to obtain optimal packing of the particles in the interspace.

Special blowing agents may be incorporated into the solid PPS to specifically tailor the foaming properties of the PPS to consistently meet specific temperature, internal pressure and/or porosity requirements. Blowing agents specially incorporated into the PPS and potentially useful with the present invention may comprise any of the conventional, volatilizable (e.g., $H_2O$) or decomposable (i.e., chemical blowing agents) blowing agents know to those skilled in the art. As a practical matter, however, special blowing agents are not required for most of the commercially available PPS. RYTON, for example, is known to innately degas at elevated temperatures and the off-gases therefrom have been found to provide more than enough blowing-/foaming for the purposes of the present invention. While the precise composition of the innate blowing agents causing the degassing are not specifically known, they are believed to comprise mainly volatilizable substances retained by the PPS during its manufacture as well as by-products from cross linking and/or decomposition of the PPS that occurs during heating. Regardless, and whatever their precise source, the most prevalent off-gases (i.e., at 6351° F. and 800° F.) have been identified as carbon dioxide, water vapor, and carbon monoxide. Hydrogen sulfide is evident when the PPS is heated to 800° F., especially in the absence of oxygen. Other off-gases in lesser amounts have also been identified and include various combinations of carbonyl sulfide, methane, sulfur dioxide, ethane, ethylene, propane, propylene, benzene and other hydrocarbons.

DETAILED DESCRIPTION OF SPECIFIC EMBODIMENTS OF THE INVENTION

The invention may better be understood by reference to the following detailed description of certain specific embodiment thereof which are described hereafter in conjunction with the several drawings in which:

FIG. 1 is an exploded isometric view of a traction motor interpole coil prior to assembly in accordance with the preferred embodiment of the present invention;

FIG. 2 is a plan view of an interpole coil after foaming the PPS ground insulation therein;

FIG. 3 is a magnified sectional view at the designated location of the coil of FIG. 2;

FIG. 4 is an abridged, enlarged view depicting another embodiment of the process of the present invention;

Figure 5:
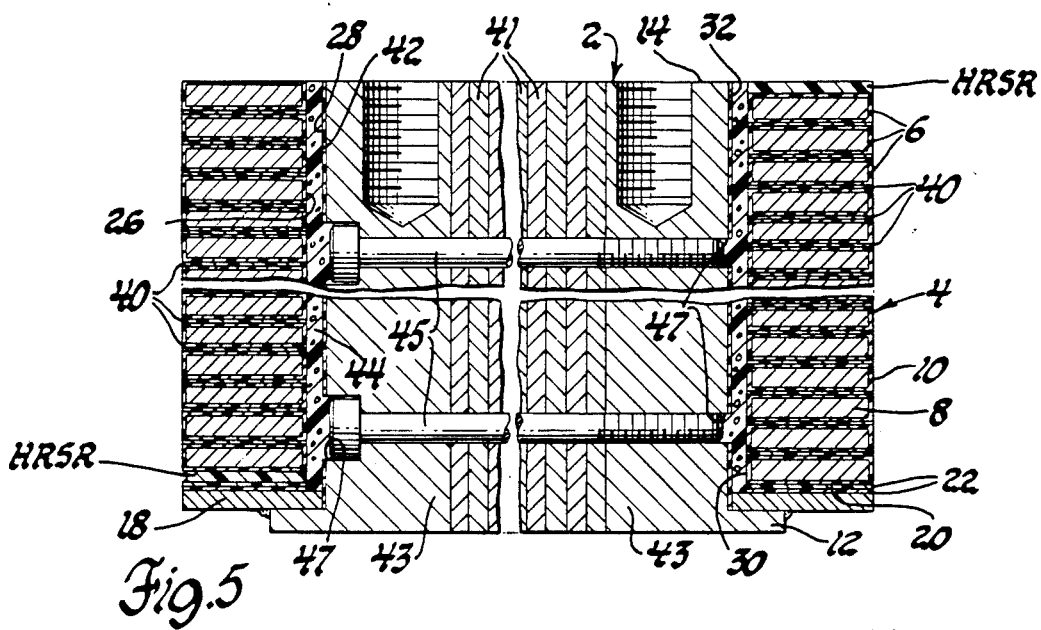
FIG. 5 is an abridged, enlarged view taken in the direction 5—5 of FIG. 2.

The several Figures depict an interpole for a locomotive traction motor including a magnetizable pole 2 surrounded by a magnetizing coil 4. The coil 4 comprises a plurality of turns 6 of edge-wound rectangular copper strap 8 which has a thin substantially imperforate coating 10 of highly cured PPS thereon. The pole 2 has an integral coil-retainer flange 12 at one end and a plurality of bolt receiving holes 16 at the opposite end 14 for bolting the pole 2 to the field frame of the motor. In the FIGS. 1–7, an oval metal washer 18 is adapted to fit over the pole 2 and lie adjacent the flange 12 and serves to press on the outermost face 20 of the coil 4 for holding it firmly in place against the frame (not shown) when the pole 2 is bolted to the frame. In FIG. 8, a larger flange 12' welded (i.e., at 13) to the pole 2 eliminates the need for a separate washer 18. In some instances the flange 12' may be eliminated without sacrificing the interpole's ruggedness. Any number of electrically insulating oval washer members 22 are positioned between the outermost face 20 of the coil 4 and the metal washer 18 or flange 12', as appropriate, to prevent electrical shorting of the coil 4 to the pole 2. The insulating washers may comprise a glass fabric impregnated with PPS or with silicone rubber.

As best shown in FIG. 1, a sleeve 24 of foamable PPS is inserted into the cavity 26 and between the pole 2 and coil 4. When assembled, the sleeve 24 will substantially fill the annular interspace 32 (see FIG. 5) between the outer surface 28 of the pole 2 and the inner surface 30 of the coil 4.

FIG. 4 illustrates another embodiment of the process of the present invention wherein the pole 2 is first nested within the coil 4 and particulate solid foamable PPS 34 poured into the annular pole-coil interspace 32. FIG. 4 also depicts provision of a thin substantially imperforate layer 42 of highly cured PPS on the outer surface 28 of the pole 2. This layer 42 is applied to the surface 28 prior to positioning the coil 4 about the pole 2 and serves primarily to achieve maximum bonding strength between the foamed PPS ground insulation and the surface 28 of the pole 2. In this regard, several layers of a powder coating grade of PPS (e.g., RYTON PRO1) are sprayed onto the heated (i.e., about 825° F./440° C.) pole surface 28 until the desired thickness (i.e., about 0.012 in.) is built up. During the heating/foaming step, the foamed PPS ground insulation 44 (see FIG. 5) fuses to both the layer 42 and the coating 10 on the wire 8 to provide an extremely rugged unified assembly.

After the foamable PPS is introduced into the pole-coil interspace 32, the entire assembly is clamped tightly together in such a manner as to seal off the interspace 32 so as to prevent any of the foaming PPS from oozing out therefrom during the heating/foaming step of the process. This sealing off of the interspace 32 is illustrated in FIG. 7 wherein a clamping plate 36 (shown in phantom) is bolted (38) to the pole 2 using bolt holes 16 provided for holding the pole 2 to the machine frame.

Figure 6:
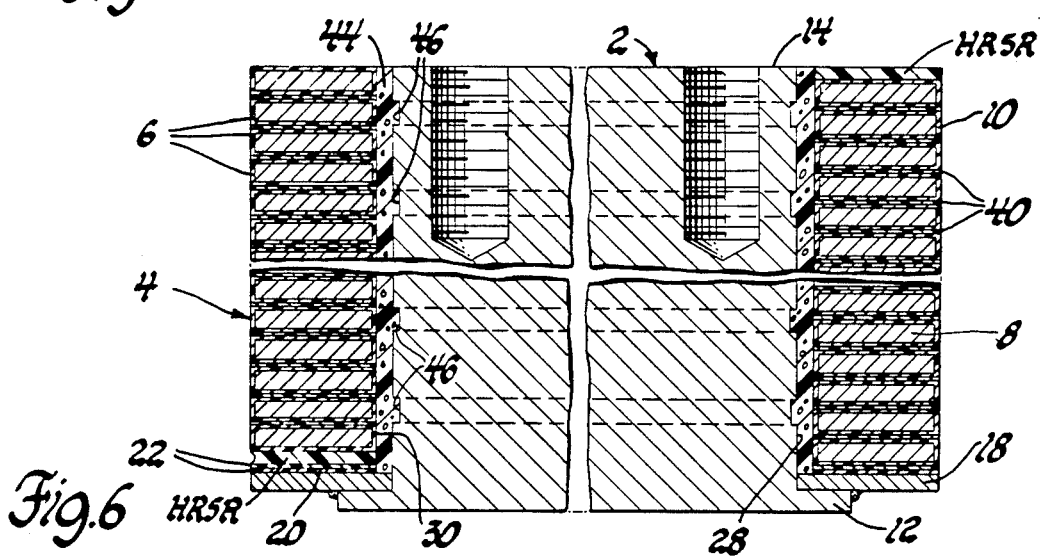
FIGS. 6 and 7 are views similar to FIG. 5 depicting other interpole assemblies made in accordance with the process of the present invention.
Figure 7:
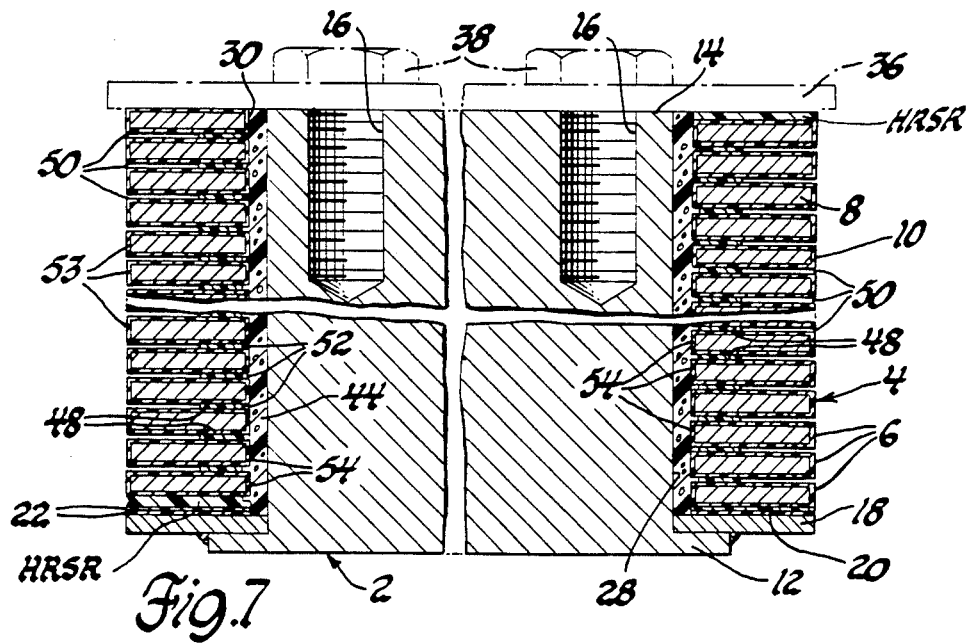
Figure 8:
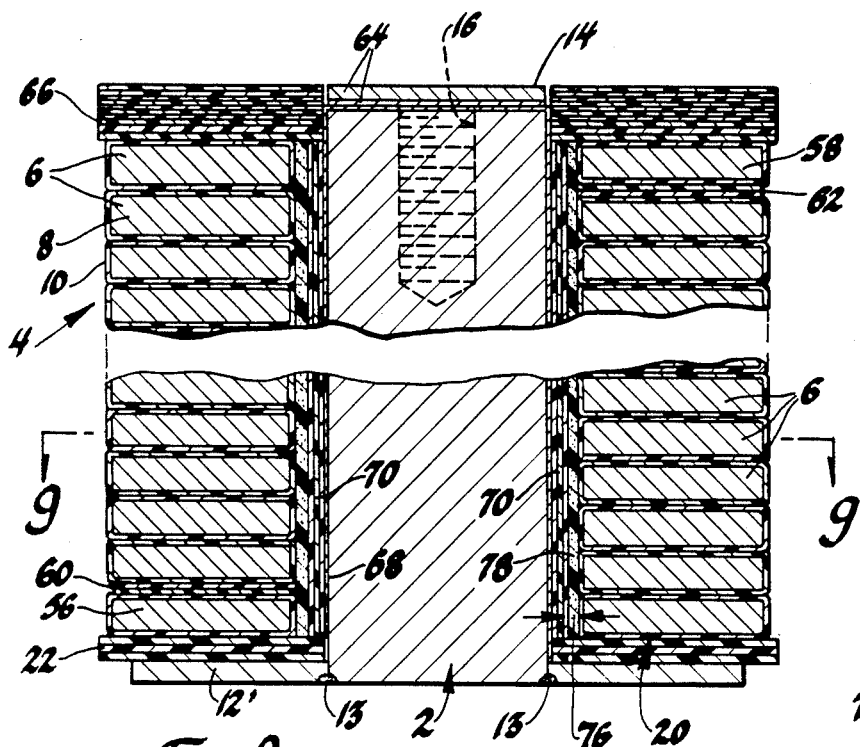
FIG. 8 is an abridged, enlarged, sectioned view of another embodiment of the present invention.

FIGS. 5–7 illustrate different interpole-coil designs producible by the process of the present invention. FIG. 5 depicts an interpole wherein the pole 2 comprises a plurality of laminations 41 held between end blocks 43 by bolts 45. A PPS coating 42 covers the outer surface 28 of the pole. A foamed PPS ground insulation 44 is fused to the coatings 42 and 10 and fills the openings 47 in the blocks 43 as well as any depressions occurring between the edges of the laminations 41 where they meet at the outer surface 28 of the pole. Moreover, the several turns 6 of the canoe-shaped insulating spacers 40. The insulating spacers 40: will preferably comprise PPS impregnated glass fabric; will provide optimum electrical insulation between the several turns 6; and will fuse well to the PPS coating 10 on the wires 8 during the heating step. FIG. 6 depicts an interpole coil wherein the surface 28 of the pole 2 is provided with several annular grooves 46 which receive the foamed PPS 44 and key or anchor the foamed PPS 44 to the pole piece 2 for increasing the pole's resistance to axial displacement with respect to the coil 4. FIG. 7 depicts still another variation of a pole and coil assembly producible in accordance with the process of the present invention. Narrow insulating spacers 48 are provided between the several turns 6 but only near the inner ends 54 thereof so as to provide air gaps 50 between the outer ends 53 of the several turns 6. The air gaps 50 permit cooling air to move between the several turns 6 for improved extraction of heat from the coil and the potential for further reduction in the amount of copper required for the wires 8 without reduction of the coil's output rating. The spacers 48 are positioned inboard the inner ends 54 of the turns so that the porous ground insulation 44 can flow into the gaps 50 between the several turns 6 for firmly embedding the inner ends of the coil therein.

EXAMPLES

The process of the present invention was used to make a number (i.e., Examples 1-4) of traction motor interpole (i.e., commutator) coils having a 33 lb. (14.9 kg) steel pole piece PPS foam potted in a 81.4 lb. (36.9 kg) copper coil. The pole piece was a laminate comprising 392 steel plates and six (6) blocks stacked side-by-side parallel to the axis of the pole and held together by bolts. The pole included two end and four central blocks into which the anchoring bolts were bored. The 392 plates were distributed between the several blocks as required to provide the desired spacing of the bolt holes. The coil comprised edge-wound copper straps having a cross section of 1.312 in. (3.33 cm)×0.285 in. (0.7239 cm). Thin [about 0.010 in. (0.25 mm)] canoe-shaped pieces of PPS impregnated glass fabric spaced one turn from the next and the coil heat bonded together prior to mating with the coil. The strap was previously coated with Phillips RYTON PR01 coating-grade PPS essentially according to the process described in Phillips Technical Service Memorandum TSM-278, entitled Electrostatic Powder Coating with RYTON PR01 (February 1978). That process essentially involves: acid cleaning the copper; plating the copper with a thin (about 0.004 mm) layer of electroless nickel; applying a PPS primer coat; and finally spraying several thin (about ca. 0.05 mm each) PPS layers onto the primed nickel to build the PPS up to the desired thickness of at least about 0.006 in. (0.15 mm). More specifically, the coil was heated to about 750° F. (399° C.) and the primer layer electrostatically applied. The primer was then oven cured for about six (6) minutes at a temperature of 750° F. (399° C.). The several PPS top coats were then applied while the coil was hot and were air cured between each application. In this regard, after each 0.05 mm layer of PPS top coat was applied, the coil was returned to the 750° F. oven and heated for about one-half hour before applying the next layer. After the final layer was applied, the coating was returned to the 750° F. oven for forty-five minutes to substantially completely cure (i.e., black color) the PPS top coat.

When placed over the pole, the inside surface of the coil was spaced from the outside surface of the pole by a gap of about 2.22 mm along the side of the pole thereby providing a corresponding annular interspace therebetween. A sleeve comprising RYTON Br-31 and conforming in size and shape to the interspace was next positioned between the pole and coil and the interspace therebetween sealed off by bolting a processing plate to the end of the pole. All remaining exits from the interspace, where foam might escape during heating, were plugged with heat reactive silicone rubber (HRSR) sealant. The assembly was then placed in a gas recirculating oven and heated sufficiently to foam the PPS and bond it to the pole.

EXAMPLE NO. 1

Three pole-coil assemblies were made as set forth above but also included a 0.012 in. (0.3 mm) PPS layer on the pole surface. In this regard, the pole was vapor blasted with small glass beads to clean its surface and then heated to a temperature of about 825° F. The surface was then electrostatically sprayed with RYTON PR01 powder and cured for about two (2) hours at about 725° F. The assembly was then placed in a gas recirculating oven preheated to 700° F. (371° C.) and heated for two and a quarter (2.25) hours. The PPS foam filled and pole-coil interspace and twenty-eight, thirty-two and thirty-five tons of axial force was required, respectively, to release the poles from their PPS foam ground insulations.

EXAMPLE NO. 2

Two more pole and coil assemblies were made as set forth in Example No. 1. A thermocouple was placed in one of the central bolt holes and the assembly heated for fifty (50) minutes in an oven preheated to 900° F. and having an atmosphere containing 90% $N_2$ and 10% CO. The pole temperature reached a maximum of 670° F. and was above 635° F. for about thirty (30) minutes. The foamed PPS ground insulation filled the pole-coil interspace and an axial force of about twenty-two (22) tons was required to break the pole piece away from the foam.

EXAMPLE NO. 3

Two more pole and coil assemblies were made substantially as set forth in Example No. 2 except that the PPS coating on the pole was eliminated. The PPS-foam ground insulation filled the pole-coil interspace and axial forces of about eleven (11) and thirteen (13) tons, respectively, were required to break the pole piece away from the foam.

EXAMPLE NO. 4

Still another pole and coil assembly like that described in Example 3 was heated for about fifty (50) minutes in an oven preheated to about 970° F. with the result that the foam filled the interspace and about twenty (20) tons of force was required to break the pole away from the foam.

Other tests (i.e., Examples A-I) were conducted with interpoles for smaller traction motors. In this regard, a number of interpole (i.e., commutator) coils were made having a 35 lb. (14.9 kg) steel pole piece PPS foam potted in a 50 lb. (36.9 kg) copper coil. The pole piece was a solid steel member essentially as shown in FIG. 1 which was shot blasted at 90 psi air pressure with NO 280 steel shot to roughen its surface. The coil comprised edge-wound copper straps having a cross section of 0.8125 in. (2.06 cm)×0.342 in. (0.868 cm). The copper strap was electrostatically PPS spray coated to a thickness of about 0.006 in. (0.152 mm), as described above for examples 1-5. Thin (about 0.25 mm) canoe-shaped pieces of insulator material (i.e., variously-PPS impregnated glass fabric, mica, epoxy-glass, and polyaramide paper were inserted between each turn of the coil. The interspace between the pole and coil was filled with foamable PPS as either a complete sleeve or as segments thereof positioned one at a time about the pole with no apparent difference in result one from the other. The interspace was then sealed off and heated.

EXAMPLE A

A pole-coil assembly was made as set forth generally above using a RYTON Br-31 (40% glass filled) sleeve to provide the foamable PPS but without shot blasting the pole. The assembly was then placed in a recirculating air oven preheated to 650° F. (343° C.) and left there for five (5) hours. The foamed-PPS filled and interspace, pole-foam interfacial bonding was good, and about fourteen (14) tons of axially applied force was required to break the pole piece away from the foam.

EXAMPLE B

A pole and coil assembly was made as set forth generally above but using RYTON R-10 (mineral filled) as the foamable PPS and with one inch (1") notches cut into the sides of the pole on the top and bottom thereof. The assembly was heated the same as set forth in Example A. The foamed PPS ground insulation filled the pole-coil interspace, pole-foam interfacial bonding was minimal, and an axial force of about thirteen (13) tons was required to break the pole piece away from the foam.

EXAMPLE C

A pole and coil assembly was made substantially as set forth in Example B except that the foamable PPS was RYTON R-4 (40% glass filled) and the center (rather than the top and bottom) of the pole had a groove one-half ($\frac{1}{2}$) inch wide by 3/16 inches deep. PPS-foam ground insulation filled the pole-coil interspace, pole-foam interfacial bonding was minimal and an axial force of about twelve (12) tons was required to break the pole piece away from the foam.

EXAMPLE D

Still another pole and coil assembly was made substantially as described in Example C except that one side of the pole-coil interspace was filled with RYTON Br-31 and one side with RYTON R-10. The PPS foam filled the interspace and about twenty-seven (27) tons of force was required to break the pole away from the foam. The Br-31 bonded very well to the surface of the pole, while, by comparison, the R-10 bonded only fairly as evidenced by blotchy adherence to the surface of the pole.

EXAMPLE E

Another pole and coil assembly was made substantially as described in Example D except that the pole-coil interspace was filled with RYTON R-4. The PPS foam filled the interspace, some bonding to the pole was evident and about 11.5 tons of force was required to break the pole away from the foam.

EXAMPLE F

Another pole and coil assembly was made substantially as generally described above using a RYTON Br-31 sleeve. The assembly was heated for one hour and forty minutes in an oven having a 90% $N_2$-10 CO atmosphere. The pole temperature reached 680° F. (360° C.) and stayed above 635° F. (335° C.) for about 40 minutes. The foam filled the interspace, foam-pole bonding was good and fourteen tons of axial force was required to separate the pole from the foam.

EXAMPLE G

Another pole and coil assembly was made substantially as described in Example F. The oven was set at 1050° F. (566° C.) and the pole reached a temperature of 690° F. (366° C.) in one and one-half hour. The pole was at a temperature above 635° F. for about 30 minutes. The foam filled the interspace, pole-coil bonding was good and fifteen tons of axial force was required to separate the pole from the foam. EXAMPLE H Another pole-coil assembly was made substantially as described in Example F. The oven was set at 850° F. (454° C.). The PPS sleeve material reached a temperature of 635° F. and remained there for about 10 minutes. The foam filled the interspace, foam-pole bonding was good and about 15 tons of axial force was required to separate the pole from the foam.

EXAMPLE I

Another pole-coil assembly was made substantially as described in Example F. The oven was set at 900° F. (482° C.) and the assembly heated for about 52 minutes. The pole reached a temperature of 675° F. (357° C.) and the PPS sleeve reached a temperature of about 675° F.±15° F. The foam filled the interspace and the foam-pole bond was excellent. Forty (40) more samples were made this way for in-service field testing—now in progress.

The aforesaid tests yielded acceptable interpoles wherein: the porosity of PPS foam varied from an estimated ten percent to about twenty-five percent by volume; the larger interpoles (Examples 1–4) were capable of withstanding potentials of 3000 volts applied between the pole and the coil for at least 10 seconds; and the smaller interpoles (Examples A–I) were capable of withstanding potentials of 6000 volts applied between the pole and coil for at least 10 seconds. Finally, it is observed that when heating/foaming the coils at oven temperatures in excess of about 800° F. oxygen-free atmospheres are recommended to reduce the chance of degrading the HRSR seals and the PPS coating on the coil wires.

Figure 10:
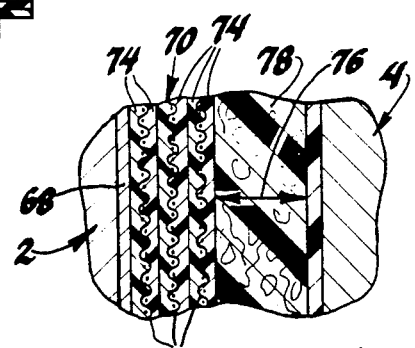
FIG. 10 is a magnified view of the segment 10 of FIG. 9.
Figure 9:
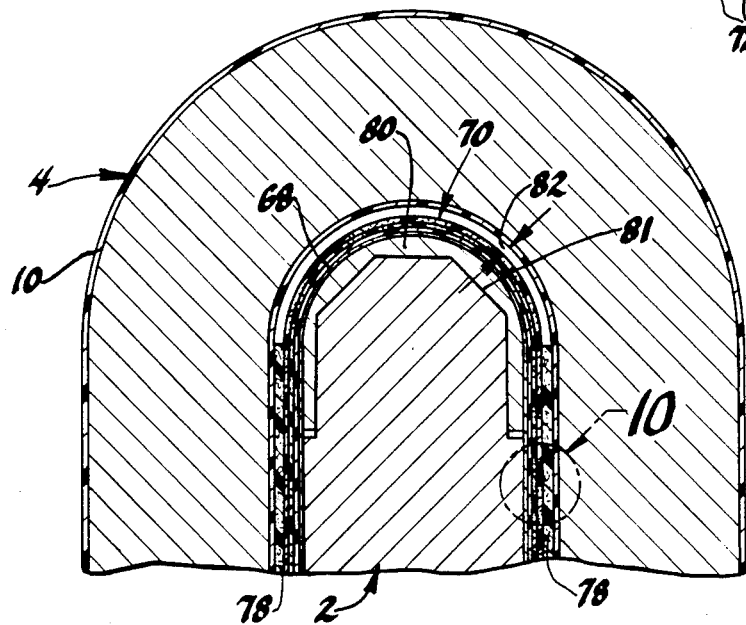
FIG. 9 is a sectioned view in the direction 9—9 of FIG. 8.

FIGS. 8–10 illustrate still another, and presently preferred, interpole coil design in accordance with the present invention. FIG. 8 depicts an interpole coil 4 having the ends 56 and 58 of the coil windings 6 spaced from the next adjacent turns by means of insulating (e.g., PPS-glass fabric) spacers 60 and 62 as required. Metal shims 64 of varying thickness may be used to properly position the interpole on the field frame (not shown) and a plurality of insulating washers/spacers 66 (e.g., PPS-glass fabric) used to maintain pressure on the coil 4 during heating (i.e., assembly to the field frame) and to insure that the coil 4 is insulated from the field frame. The pole piece 2 is: provided with metal end caps 80 for rounding off the otherwise beveled ends 81 of the pole 2; plated with a thin coating 68 of nickel for corrosion protection; and then wrapped with three layers of a PPS-bonding cloth/fabric 70 (see FIG. 10). The PPS-bonding cloth is provided by Phillips Petroleum Co. and comprises essentially a woven glass fabric 72 (i.e., about 7 mils thick) impregnated with polyphenylene sulfide such as to leave skins 74 (e.g., about 2½ mils thick) of PPS on the major surfaces thereof. Assembly-wise, the PPS-glass wrapped pole 2 is inserted loosely into the center of the coil 4 leaving a gap 76 therebetween of about 70 mils. Thereafter, rigid boards or slabs of PPS-glass mat 78 (here shown after heating/swelling), provided by Phillips Petroleum Co., are inserted into the gap 76 to fit the pole 2 and coil 4 snugly together. The gaps 82 between the ends of the wrapped pole 2 and the coil 4 will preferably be filled with a preformed, conforming PPS-glass mat. However, the gaps 82 at the ends of the pole may also be left empty, as shown. In this latter regard, the ability of the glass mat 78 to substantially contain the PPS during heating and focus the direction of swell toward the pole and coil substantially prevents any substantial filling of the air gap 82 at the ends of the pole piece 2. The assembly is next clamped (e.g., see plate 36 of FIG. 7) together to hold the coil 4 securely compressed during heating and cooling to insure good bonding of the several turns 6 to each other and to the pole piece 2.

Unlike the embodiments discussed in conjunction with FIGS. 1-7 and because the mat contains the PPS during heating, it is not as essential to plug all exit openings from the gap 76 or to otherwise substantially seal off the space/region between the pole and coil to contain the foamable PPS during heating.

The thusly assembled and clamped interpole is placed in an oven heated to 750° F. and left therein until the center of the pole 2 reaches a temperature of 650° F. (i.e., measured by a thermocouple in the bottom of the bolt hole 16). At that time, the heat is shut off, the oven door opened and the assembly allowed to cool naturally down to room temperature.

Interpole assemblies made as described immediately above will preferably have their coils 4 coated with PPS 10 by: (1) heating the metal coil to between 700° F. and 750° F. and spraying a first layer of PPS thereon; (2) allowing the coated coil to cool to about 400° F. and thereat spraying a second layer of PPS thereon; (3) heating the coil to 700° F. for 1¼ hours to cure the first two coatings; (4) allowing the coil to cool to 400° F. and thereat applying a third layer of PPS; (4) heating the coil to 600° F. for about six minutes to flow out the third layer of PPS; (5) cooling the coil to 400° F. and thereat applying a fourth layer of PPS; and (6) heating the coil to 700° F. for 1¼ hours to cure the PPS.

While this invention has been described in terms of specific embodiments thereof it is not intended to be limited thereto but rather only to the extent set forth hereafter in the claims which follow.

The embodiments of the invention in which an exclusive property or privilege is claimed are defined as follows:

1. In the process of making a pole and coil assembly for a dynamo-electric machine including the principal steps of positioning said coil about said pole so as to provide a space therebetween defined primarily by the inside surface of said coil and the outside surface of said pole and filling said space with dielectric insulation the improvement comprising:
   a. providing said coil surface with an adherent, substantially imperforate coating of polyphenylene sulfide;
   b. substantially filling said space with a foamable insulation in its solid state, said foamable insulation comprising a molding grade polyphenylene sulfide and a thermally activated blowing agent therefor;
   c. sealing off said space to substantially contain said foamable insulation during subsequent heating of said assembly;
   d. heating said assembly to melt said polyphenylene sulfide insulation and to activate said blowing agent for foaming said insulation within the confines of said space, said heating being sufficient to bond said foam to said coating and said pole and to so swell said polyphenylene sulfide insulation that the swollen polyphenylene sulfide insulation substantially completely fills said space and constrictively engages said pole;
   e. solidifying said foamed insulation in substantially its swollen state.

2. The process as defined in claim 1 including the step of relieving said pole surface to provide at least one anchorage site for said insulation on said surface.

3. In the process of making a pole and coil assembly for a dynamo-electric machine including the principal steps of positioning said coil about said pole so as to provide a space therebetween defined primarily by the inside surface of said coil and the outside surface of said pole and filling said space with dielectric insulation the improvement comprising:
   a. providing said coil surface with an adherent, substantially imperforate coating of polyphenylene sulfide;
   b. roughening said outer surface of said pole;
   c. filling said space with a foamable insulation in its solid state, said foamable insulation comprising a molding grade polyphenylene sulfide and a thermally activated blowing agent therefor;
   d. sealing off said space to substantially contain said foamable insulation during subsequent heating of said assembly;
   e. heating said assembly to at least about 635° F. for a time sufficient to liquify said polyphenylene sulfide insulation, to activate said blowing agent for foaming said insulation within the confines of said space, and to bond said foam to said coating and said pole, said foaming being sufficient to so swell said polyphenylene sulfide insulation that the swollen polyphenylene sulfide insulation substantially completely fills said space and constrictively engages said pole;
   f. cooling said assembly to solidify said foamed insulation in substantially its swollen state.

4. The process as defined in claim 3 including the steps of coating said outer surface of said pole with an adherent layer of polyphenylene sulfide prior to said positioning and so heating said assembly as to fuse said foamed insulation to both said coating and said layer.

5. The process as defined in claims 1, 2, 3 or 4 wherein said insulation further comprises glass fibers.

6. In the process of making a pole and coil assembly for a dynamo-electric machine including the principal steps of positioning said coil about said pole so as to provide a space therebetween defined primarily by the inside surface of said coil and the outside surface of said pole and filling said space with dielectric insulation the improvement comprising:
   a. providing said coil surface with an adherent substantially imperforate coating of polyphenylene sulfide;
   b. positioning at least one solid block of said insulation in said space, said block comprising a molding grade polyphenylene sulfide having a swelling coefficient of at least about 1.1 and a thermally activated blowing agent therefor;
   c. sealing off said space to substantially contain said insulation during subsequent heating of said assembly;
   d. heating said assembly sufficiently to raise the temperature of said polyphenylene sulfide insulation and said pole surface to at least about 635° F. and to so activate said blowing agent as to foam and swell said polyphenylene sulfide insulation with the confines of said space such that the polyphenylene sulfide foam substantially completely fills said space, constrictively engages said pole, and bonds to said coating and said pole; and;
   e. cooling said assembly to solidify said foamed insulation in substantially its swollen state.

7. The process as defined in claim 6 wherein said block comprises a sleeve for said pole, said sleeve having a size and shape conforming substantially to the size and shape of said space.

8. The process as defined in claims 6, or 7 including the additional step of roughening said pole surface.

9. In the process of making a pole and coil assembly for a dynamo-electric machine including the principal steps of positioning said coil about said pole so as to provide a space therebetween defined primarily by the inside surface of said coil and the outside surface of said pole and filling said space with dielectric insulation the improvement comprising:
   a. providing said coil surface with an adherent substantially imperforate coating of polyphenylene sulfide;
   b. coating said outside surface of said pole with an adherent layer of polyphenylene sulfide;
   c. positioning at least one solid block of said insulation in said space, said block comprising a molding grade polyphenylene sulfide having a swelling coefficient of at least about 1.1 and a thermally activated blowing agent therefor;
   d. substantially sealing off said space to substantially contain said insulation therein during subsequent heating of said assembly;
   e. heating said assembly sufficiently to raise the temperature of said polyphenylene sulfide insulation and said pole surface to at least about 635° F. and to so activate said blowing agent as to foam and swell said polyphenylene sulfide insulation within the confines of said space such that the polyphenylene sulfide foam substantially completely fills said space, constrictively engages said pole, and bonds to said coating and said layer; and
   f. cooling said assembly to solidify said foamed insulation in substantially its swollen state.

10. The process as defined in claims 6, 7 or 9 wherein said block further comprises glass fibers.

11. In the process of making a pole and coil assembly for a dynamo-electric machine including the principal steps of positioning said coil about said pole so as to provide a space therebetween and introducing dielectric insulation into said space, the improvement comprising:
   a. providing an adherent, substantially imperforate coating of polyphenylene sulfide on the inside surface of said coil confronting said pole;
   b. introducing a solid, foamable dielectric insulation into said space, said foamable insulation comprising polyphenylene sulfide and a thermally activated blowing agent therefor;
   c. substantially containing said foamable insulation within said space during subsequent heating of said assembly;
   d. heating said assembly to melt said polyphenylene sulfide insulation, activate said blowing agent, foam said insulation and swell it into tight engagement with said pole and coil, said heating being sufficient to bond said foamed insulation to said coating and said pole;
   e. solidifying said foamed insulation in substantially its swollen state.

12. In the process of making a pole and coil assembly for a dynamo-electric machine including the principal step of electrically insulating said coil from said pole by providing dielectric insulation in a region of said assembly between said pole and a surrounding said coil, the improvement comprising:
   providing an adherent, substantially imperforate coating of polyphenylene sulfide on the inside surface of said coil confronting said pole;
   b. providing a solid, foamable dielectric insulation in said region, said foamable insulation comprising polyphenylene sulfide and a thermally activated blowing agent therefor;
   c. heating said assembly to melt said polyphenylene sulfide insulation, activate said blowing agent foam said insulation and swell it into tight engagement with said pole and coil, said heating being sufficient to bond said foamed insulation to said coating and said pole;
   d. substantially confining the foaming insulation within said space during said heating such that the foaming insulation exerts pressure on said pole and coil as it swells to effect said tight engagement; and
   e. solidifying said foamed insulation in substantially its swollen state.

13. The process as defined in claim 12 wherein said foamable insulation is confined in said region during heating by entrapment within the interstices of a mat comprising long, randomly oriented, entangled glass fibers.

14. The process as defined in claim 12 or 13 wherein at least one layer of polyphenylene sulfide impregnated glass cloth is wrapped about said pole and said foam-pole bonding occurs via said cloth.

15. In the process of making a pole and coil assembly for a dynamo-electric machine including the principal steps of positioning said coil about said pole so as to provide a space therebetween and filling said space with dielectric insulation the improvement comprising:
   a. providing said coil with an adherent, substantially imperforate coating of polyphenylene sulfide;
   b. applying at least one layer of bonding cloth to said surface of said pole, said cloth comprising a woven glass substrate having a polyphenylene skin on the major surfaces thereof;
   c. positioning slabs of foamable insulation in said space, said slabs comprising high melting polyphenylene sulfide and a thermally activated blowing agent therefor distributed throughout a mat of long, randomly oriented, entangled glass fibers sufficient to substantially contain said polyphenylene sulfide within said space upon subsequent heating;
   d. heating said assembly to at least about 635° F. for a time sufficient to liquify said polyphenylene sulfide insulation, to activate said blowing agent for foaming said insulation so as to substantially completely fill said space, and to bond said foam to said coating and said cloth;
   e. cooling said assembly to solidify said foamed insulation in substantially its swollen state.

16. Process according to claim 15 wherein a layer of nickel is plated onto the surface of said pole prior to the application of said bonding cloth.

17. Process according to claim 16 wherein an adherent coating of polyphenylene sulfide is applied to said nickel layer prior to the application of said bonding cloth.

* * * * *